April 23, 1957 S. J. BEGUN ET AL 2,789,776

RECORDER ASSEMBLY

Filed Jan. 11, 1954 3 Sheets-Sheet 1

*INVENTORS.*
SEMI JOSEPH BEGUN
EVERETT R. SARRATT
ALFRED P. DANK

BY William J. Flynn
ATTORNEY

April 23, 1957 S. J. BEGUN ET AL 2,789,776

RECORDER ASSEMBLY

Filed Jan. 11, 1954 3 Sheets-Sheet 2

*INVENTORS.*
SEMI JOSEPH BEGUN
EVERETT R. SARRATT
ALFRED P. DANK

BY William J. Flynn
ATTORNEY

RECORDER ASSEMBLY

Filed Jan. 11, 1954 3 Sheets-Sheet 3

*INVENTORS.*
SEMI JOSEPH BEGUN
EVERETT R. SARRATT
ALFRED P. DANK
BY William J. Flynn
ATTORNEY United States Patent Office 2,789,776

Patented Apr. 23, 1957

2,789,776

RECORDER ASSEMBLY

Semi Joseph Begun and Alfred P. Dank, Cleveland Heights, Euclid, Ohio, and Everett R. Sarratt, Paterson, N. J., assignors to Clevite Corporation, Cleveland, Ohio, a corporation of Ohio Application January 11, 1954, Serial No. 403,412

5 Claims. (Cl. 242—55)

This invention relates to a recorder assembly.

In the copending application of S. J. Begun et al. Serial No. 402,388, filed January 5, 1954, there is disclosed and claimed a recording arrangement in which a multichannel magnetic record tape and a multichannel visual record chart each extend around the periphery of a rotary drum at opposite sides thereof. The drum rotates to move the magnetic record tape past a multichannel magnetic head assembly to record transient signals during a magnetic recording interval and to move the visual record chart past a pen recorder for reproducing the magnetically recorded signals as visual traces as the magnetic record tape is again moved past the magnetic head assembly following the magnetic recording interval. In that particular recording arrangement, as well as in various other recording arrangements in which the record medium is mounted to move through an endless path, after a recording interval or a recording and reproducing sequence it is usually desirable to provide a new length of the recording medium for use in the next recording interval. This is especially true where the recording medium is intended to be preserved as a permanent record.

The present invention is concerned with a novel arrangement which facilitates the positioning of successive lengths of a recording medium on an endless recording track, such as on the periphery of a rotary drum.

Accordingly, it is an object of the present invention to provide a novel recorder assembly having provision for selectively positioning successive lengths of a continuous flexible recording medium on a movable endless support and for storing the remainder of the recording medium on the support.

Other and further objects and advantages of this invention will be apparent from the following description of a preferred embodiment thereof, which has particular utility in the recorder disclosed and claimed in the above-mentioned copending application of S. J. Begun et al, and which is illustrated in the accompanying drawings.

Figure 1:
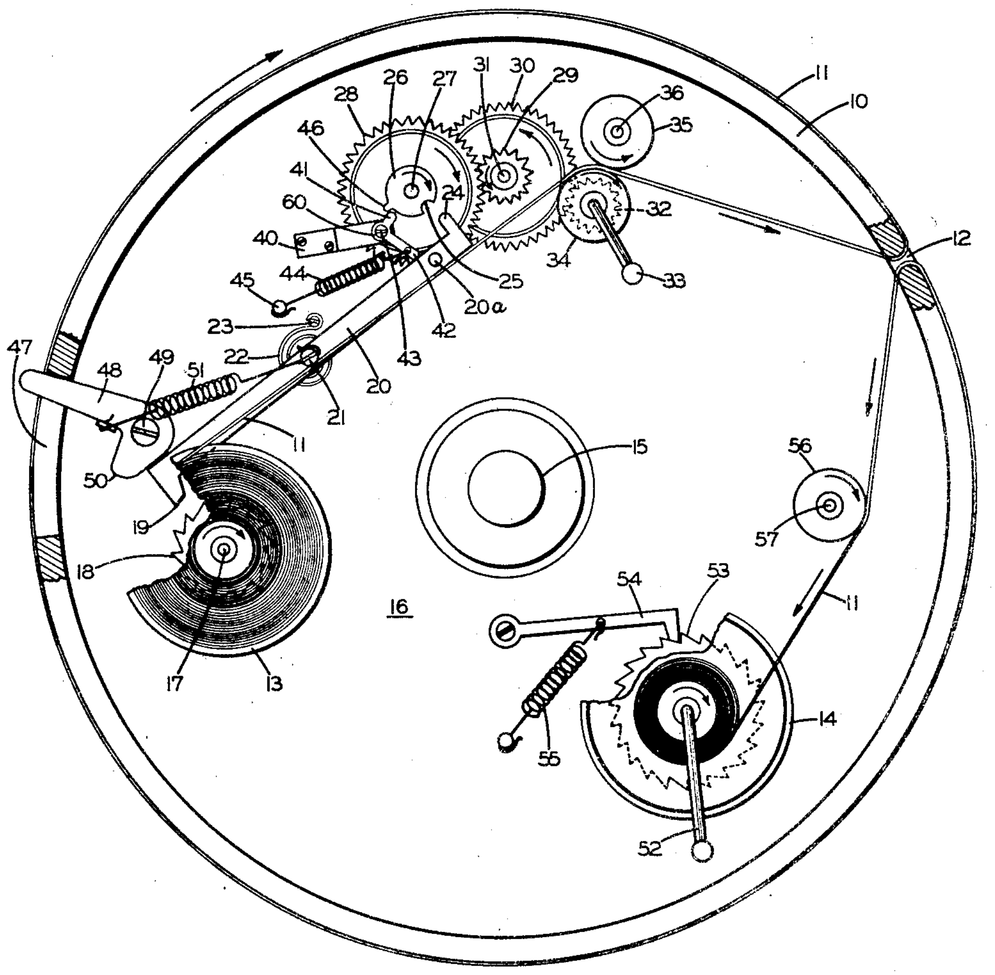
Figure 1 is an end view, with parts broken away, showing a portion of the present assembly on a rotary drum which provides the movable endless support for the record medium.

In the illustrated embodiment of the present invention there is provided a rotary drum 10 having a cylindrical periphery around which is wrapped, at one side of the drum, a length of flexible magnetic tape 11. At one portion of its periphery the drum is formed with a narrow transverse slot 12 through which the tape 11 extends from a supply reel 13 and returns to the takeup reel 14. Thus, the magnetic tape 11 extends completely around the drum periphery, except at slot 12. The drum 10 is mounted rigidly on a rotary shaft 15, which extends through the central axis of the drum. The drum is also formed with an internal transverse wall 16, which extends perpendicular to shaft 15 and which rigidly supports the substantially annular peripheral rim of the drum.

The supply reel 13 is mounted rotatably on a stationary shaft 17, which projects out from the internal transverse drum wall 16. A ratchet wheel 18 is attached rigidly to the supply reel 13 and is positioned to be engaged by a pawl tooth 19 mounted on the lower end of a lever 20. Lever 20 intermediate its ends is mounted rigidly on a cross pin 21, which is supported rotatably by the transverse internal drum wall 16. A coil spring 22 is secured at one of its ends to the cross pin 21, while the other end of this spring is secured fixedly by a screw 23 mounted on the transverse internal drum wall 16. This spring biases the lever 20 counterclockwise in Figs. 1 and 2 to urge the pawl tooth 19 on the lower end of the lever down into engagement with the ratchet wheel 18. The lever 20 carries a transversely protruding handle 20a by which the lever may be moved manually clockwise against the bias of spring 22.

At its upper end lever 20 carries a projecting finger 24 which is adapted to be received in a recess or notch 25 formed in the generally cylindrical periphery of a rotary cam 26. Cam 26 is supported rotatably by a rigid shaft 27, which projects out from the transverse internal drum wall 16. A gear 28, which is attached rigidly to cam 26, meshes with a driving pinion 29, which in turn is rigidly attached to a gear 30. Gear 30 and pinion 29 are mounted rotatably on a rigid shaft 31 which projects out from the transverse internal drum wall 16. Gear 30 meshes with a driving gear 32 attached rigidly to a manual crank 33. The crank also is connected rigidly to a roller 34, which engages the tape 11 beyond the supply reel 13. The rigid assembly of crank 33, roller 34 and gear 32 is supported rotatably by the transverse internal drum wall 16. An idler roller 35 is supported rotatably by a shaft 36, which projects out from the transverse internal drum wall 16, to engage the opposite face of the tape 11 directly opposite the roller 34.

The internal drum wall 16 also supports rigidly a bracket 40 on which is supported pivotally a bell crank lever 60 having the outwardly projecting fingers 41 and 42, which extend at right angles to one another. This lever is mounted to pivot about a cross pin 43 carried by bracket 40. A helical tension spring 44 at one end is attached to the finger 42 on bell crank lever 60 and at its other end is fixedly attached to a cross pin 45 mounted on the internal drum wall 16. This spring biases the bell crank lever clockwise in Figs. 1 and 2 to normally position the lever finger 41 in the path of movement of a projection 46, which protrudes from the periphery of cam 26, and to cause the other lever finger 42 to bear down against the upper end of lever 20.

The drum rim inwardly of the location of the magnetic tape 11 thereon is formed with an elongated slot 47 through which a pivoted drum interlock lever 48 is adapted to extend. As disclosed in the above-mentioned copending application of S. J. Begun et al., Serial No. 402,388, this drum interlock lever, when it projects out beyond the rim of the drum, actuates one control switch to initiate the magnetic recording interval and then, after the drum has completed substantially a full rotation following such switch actuation, the lever actuates a second switch which terminates the magnetic recording interval. The drum interlock lever 48 is pivoted on a cross pin 49 carried by the transverse internal drum wall 16 and is formed with a cam surface 50 which bears against the pawl end of lever 20. A helical tension spring 51 is attached at one end to the interlock lever 48 and at its other end is secured to the pivot pin 21 for lever 20. When the connection of spring 51 to the interlock lever 48 is to one side of the line joining the fixed end of this spring and the pivot 49 for this lever, as shown in Fig. 2, this spring maintains the interlock lever at a retracted position in which it does not project beyond the periphery of the drum. However, when the lever 20 is pivoted to retract the pawl tooth 19 away from the ratchet wheel 18, it pivots the interlock lever 48 clockwise in Figs. 1 and 2 to move spring 51 overcenter so that the connection of spring 51 to the interlock lever is displaced to the opposite side of the line joining the mounted end of this spring and the pivot 49 for the interlock lever, at which position the interlock lever projects out through the drum slot 47 (Fig. 1).

The takeup reel 14 is attached to a manual crank 52 which is rotatably mounted on the transverse internal drum wall 16. A ratchet wheel 53 is attached rigidly to the crank 52 and is positioned to be engaged by a pivoted pawl 54, which is biased by a helical tension spring 55 to engage the ratchet teeth. The pawl permits the ratchet wheel to turn clockwise in Figs. 1 and 2. A rotary idler roller 56 is mounted rotatably on a shaft 57 supported fixedly by the internal transverse drum wall 16 and exerts a slight tension on the tape 11 ahead of the takeup reel 14.

*Operation*

Figure 2:
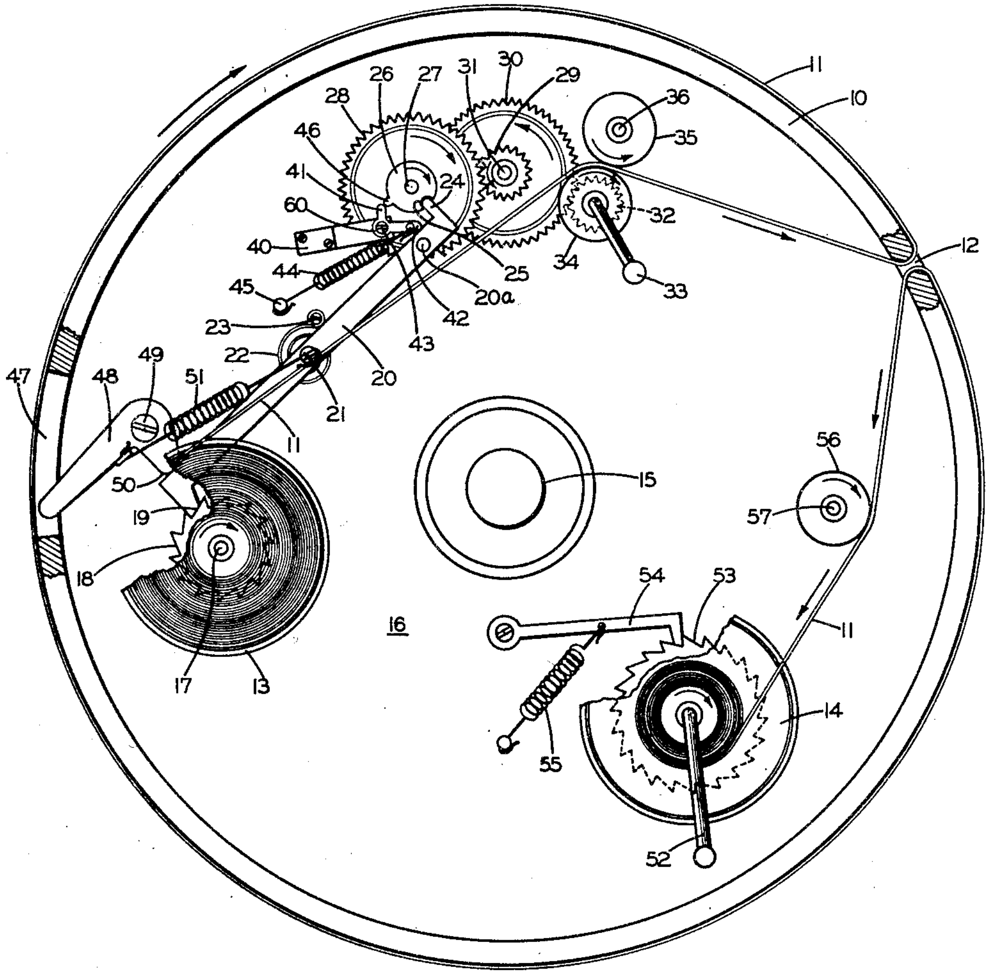
Figure 2 is a view similar to Fig. 1, showing the parts positioned at a different stage in the operation of the device.

In the operation of the foregoing mechanism, prior to a magnetic recording interval the parts are in the condition shown in Fig. 1. This condition is established by pulling the lever handle **20*a* downward to retract the pawl tooth 19 on lever 20 away from ratchet wheel 18 and to retract the lever finger 24 away from cam 26. When this action takes place the lever 20 pivots the interlock lever 48 clockwise to position the interlock lever 48 projecting out through drum slot 47 beyond the periphery of the drum. The arm 42 of bell crank lever 60 under the influence of spring 44 bears down against the upper end of lever 20 to maintain lever 20 in the retracted position to which it was actuated manually. The bias of coil spring 22 is overcome by this action of the bell crank lever 60**.

The crank 33 is then turned manually (clockwise in Figs. 1 and 2) to turn the roller 34 and pull a new length of magnetic tape from the supply reel 13. At the same time the crank 52 for the takeup reel 14 is also turned clockwise to take up the slack in the magnetic tape around the drum. When the crank 33 is turned clockwise, it turns cam 26 slowly through a reduction drive consisting of gears 32, 30, 29, and 28. The parts are so proportioned that the cam 26 completes a full revolution after a sufficient amount of magnetic tape has been unwound from the supply reel 13 to provide a completely new section of tape entirely around the drum periphery.

When the crank 33 has been turned to complete a full rotation of cam 26, the protrusion 46 on the cam engages the finger 41 on the bell crank lever 60, pivoting this lever counterclockwise in Figs. 1 and 2 so that the lever 20 is free to move clockwise to displace its finger 24 toward the cam 26 under the influence of spring 22. When this happens the cam recess 25 is immediately adjacent to the finger 24 at the upper end of lever 20. This lever finger drops into this recess to lock the lever 20 in this position until it is again manually actuated. This locks the cam 26 against further rotation, and as a result the roller 34 is also locked against further rotation because of the gear drive connection between it and the cam. At the same time the pawl tooth 19 on the opposite end of lever 20 drops into engagement with the ratchet wheel 18, thereby locking the supply reel 13 against further rotation. By properly proportioning the parts, the proper length of tape will have been paid out from the supply reel at this time. The interlock lever 48 is maintained in the Fig. 1 position by its spring 51.

During the magnetic recording interval the drum turns clockwise in Figs. 1 and 2 to move the magnetic tape on its periphery past a magnetic head assembly (not shown) which records the information signals on the tape. The recording interval is terminated when the interlock lever 48 actuates a switch (not shown) positioned adjacent the periphery of the drum to be engaged by the outer end of the interlock lever. When such switch actuation takes place, the interlock lever 48 is pivoted (counterclockwise in Fig. 1) back inside the drum to the Fig. 2 position.

Following the recording and reproducing sequence a new length of magnetic tape may be paid out from the supply reel by pulling down the lever handle **20*a* and then turning the crank 33. Again the correct length of tape, corresponding to substantially a complete rotation of cam 26, will be withdrawn from the supply reel 13, after which the lever finger 24 drops into the cam notch 25** to terminate the withdrawal of tape from the supply reel. After this, the mechanism is ready for another recording and reproducing sequence.

*Drum balance compensation*

It will be noted that, with the above-described mechanism, the magnetic record tape 11 is transferred progressively from the supply reel 13 at one side of the drum to the takeup reel 14 at the other side of the drum. This, of course, tends to unbalance the drum and it is desirable to provide an adjustable weight to compensate for this shifting of the weight distribution in the drum.

To this end, in the illustrated embodiment of the present invention at the opposite side of the transverse internal drum wall 16 there is provided a weight assembly, indicated generally at 60 (Fig. 3), mounted for adjustment to compensate for any drum unbalance. This weight assembly is mounted for adjustable positioning along a channel iron 61 which extends out from a plate 62 clamped onto the axial drum shaft 15. The clamping plate 62 is formed with an arcuate recess 63 which snugly engages one side of the drum shaft 15, while a similar clamping plate 64 has an arcuate recess 65 which engages the opposite side of the drum shaft. A pair of screws 66 clamp the plates 62 and 64 tightly on shaft 15, so that the outwardly projecting channel iron revolves about the axis of the drum as the drum rotates.

Figure 3:
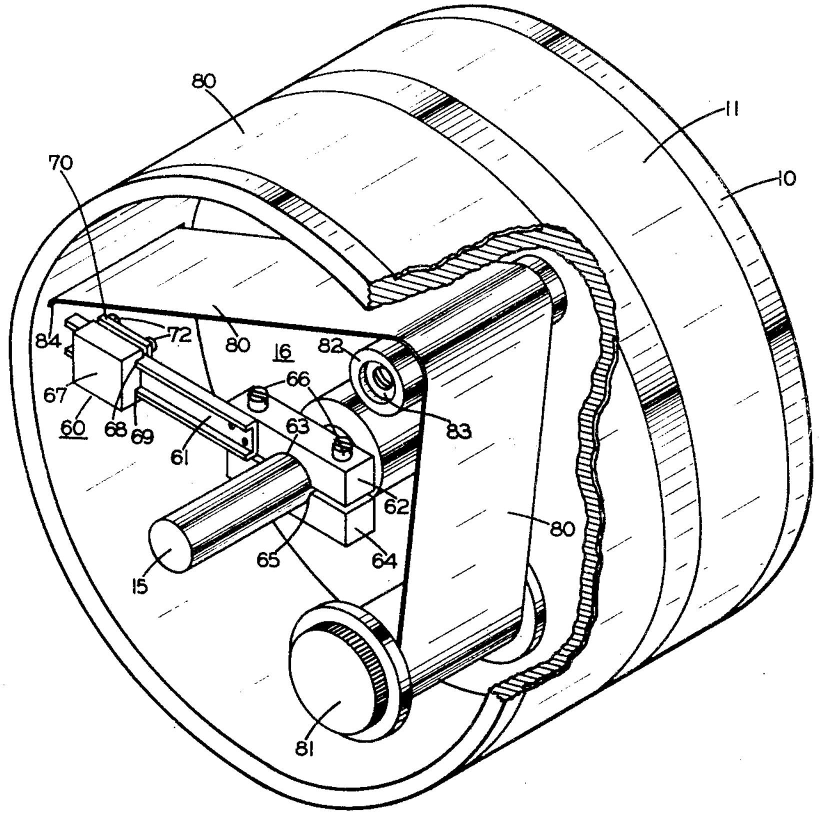
Figure 3 is a perspective view, taken from the opposite end of the drum and showing the remainder of the mechanism of the present invention.
Figure 4:
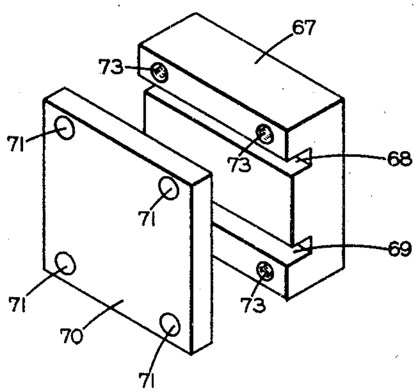
Figure 4 is an exploded perspective view of an adjustable weight for balancing the drum.

The adjustable weight assembly 60 includes a relatively thick plate 67, which is formed at one face with spaced parallel grooves 68 and 69 to receive the spaced transverse arms on the channel iron 61, as best seen in Fig. 3. The weight assembly also includes a flat plate 70 which abuts against the back face of the channel iron 61. Plate 70 is formed with four holes 71 for receiving headed screws 72 which are threadedly received in threaded openings 73 in the inner face of plate 67, above and below the grooves 68 and 69 therein.

With this arrangement, should the drum become unbalanced the weight assembly 60 may be shifted along channel iron 61 to compensate for this unbalance simply by loosening the clamping screws 72, sliding the weight assembly along the channel iron to a new spot thereon, and then tightening the screws 72 to clamp the weight assembly at this new position.

In the illustrated embodiment, the drum 10 also carries a paper visual record chart 80 on its periphery at the opposite side from the magnetic tape 11. The drum as it rotates moves the record chart on its periphery past a pen recorder assembly (not shown) which produces on the chart visual traces corresponding to the signals previously recorded magnetically on the magnetic record tape 11, as disclosed in greater detail in the copending application of S. J. Begun et al., Serial No. 402,388. This visual record chart extends from a supply reel 81 supported rotatably by the transverse internal drum wall 16 at the same side of this drum wall as the adjustable weight assembly 60. From this supply reel the visual record chart extends around an idler roll 82 supported rotatably on a shaft 83 projecting out from the drum wall 16 and thence out through a transverse slot 84 in the drum periphery and around the periphery of the drum. The free end of the record chart 80 is suitably secured to the periphery of the drum. After each recording and reproducing sequence the length of the chart on which visual traces were made during the reproducing interval is torn off, and then a new length of the record chart is pulled out through the drum slot 84 and wrapped around the drum periphery.

It is to be understood that, while in the foregoing description and the accompanying drawings there is disclosed a specific preferred embodiment of the present invention, various modifications, omissions and refinements which depart from the disclosed embodiment may be adopted without departing from the spirit and scope of this invention.

We claim:

1. In a recorder, the combination of a rotary drum formed with a transverse slot in its periphery, a rotary supply reel in the drum, a flexible continuous record tape wound on the supply reel and extending from the supply reel out through the slot in the periphery of the drum and around the periphery of the drum, a roller engaging the record tape between the supply reel and the drum slot for withdrawing tape from the supply reel, a rotary cam driven from said roller, said cam being formed with a protrusion at its periphery and a recess in its periphery spaced from said protrusion, a ratchet wheel attached to said supply reel to control the latter's rotation, an elongated lever pivotally mounted between its ends on the drum, said lever at one side of its pivotal mounting carrying a pawl tooth for engagement with the ratchet wheel to prevent the latter from rotating, said lever at the opposite side of its pivotal mounting carrying a finger for engagement with the periphery of the cam, a spring biasing said lever to position its pawl tooth in engagement with the ratchet wheel and to position its finger in engagement with the periphery of the cam, a bell crank lever pivotally mounted in said drum and having a first arm engaging said first mentioned lever at said opposite side of the latter's pivotal mounting, said bell crank lever having a second arm interposed in the path of movement of said cam protrusion as the cam rotates, a spring biasing the bell crank lever to cause said first arm of the bell crank lever to bear against said first-mentioned lever to position said first-mentioned lever with its finger retracted away from the periphery of the cam and its pawl tooth retracted away from the ratchet wheel, said cam turning in response to rotation of the roller for withdrawing tape from the supply reel and after a predetermined length of tape has been withdrawn from the supply reel moving its protrusion into engagement with said second arm of the bell crank lever to pivot the bell crank lever against the bias of its spring to move its first arm away from said first-mentioned lever to permit said first-mentioned lever to move under the bias of its spring to position its finger in the recess in the cam periphery to terminate the turning of the cam and to position its pawl tooth in engagement with the ratchet wheel to stop the rotation of the supply reel and thereby terminate the withdrawal of the tape from the supply reel.

2. The combination of claim 1, wherein there is provided a reduction gear drive between said roller and said cam, so that the cam turns slower than said roller and said roller is locked against further rotation when the finger on said first-mentioned lever engages the recess in the cam periphery to terminate the turning of the cam.

3. The combination of claim 1, wherein there is provided a rotary takeup reel in the drum and said record tape extends around the periphery of the drum back through the drum slot to the takeup reel, and means for turning said takeup reel to take up the tape as the tape is withdrawn from the supply reel.

4. The combination of claim 3, wherein there is also provided a compensating weight, and means supporting said weight for adjustable positioning in the drum to counterbalance the weight shift due to the transfer of the record tape from the supply reel to the takeup reel.

5. In combination, a support, a supply reel and a takeup reel mounted rotatably on said support in spaced relation from one another, an elongated flexible sheet wound around said supply reel and extending from the supply reel across said support to the takeup reel, a rotary sheet-advancing member engaging said sheet between the supply reel and the takeup reel for advancing the sheet from the supply reel to the takeup reel, a rotary cam driven from said sheet-advancing member, said cam being formed with a protrusion at its periphery and a recess in its periphery spaced from said protrusion, a ratchet wheel attached to one of said reels, an elongated lever pivotally mounted between its ends on said support, said lever at one side of its pivotal mounting carrying a pawl tooth for engagement with the ratchet wheel to prevent the latter from rotating, said lever at the opposite side of its pivotal mounting carrying a finger for engagement with the periphery of the cam, a spring biasing said lever to position its pawl tooth in engagement with the ratchet wheel and to position its finger in engagement with the periphery of the cam, a bell crank lever pivotally mounted on said support and having a first arm engaging said first-mentioned lever at said opposite side of the latter's pivotal mounting, said bell crank lever having a second arm interposed in the path of movement of the protrusion on the cam as the cam rotates, a spring biasing the bell crank lever to position said first arm of the bell crank lever bearing against said first-mentioned lever to position said first-mentioned lever with its finger retracted away from the periphery of the cam and its pawl tooth retracted away from the ratchet wheel, said cam turning in response to rotation of said sheet-advancing member for withdrawing the sheet from the supply reel and after a predetermined length of the sheet has been withdrawn from the supply reel moving its protrusion into engagement with said second arm of the bell crank lever to pivot the bell crank lever against the bias of its spring to move its first arm away from said first-mentioned lever to permit said first-mentioned lever to move under the bias of its spring to position its finger in the recess in the cam periphery to terminate the turning of the cam and to position its pawl tooth in engagement with the ratchet wheel to stop the rotation of the said one reel and thereby terminate the withdrawal of the sheet from the supply reel.

References Cited in the file of this patent

UNITED STATES PATENTS

| | | |
|---|---|---|
| 2,063,331 | Nagel | Dec. 8, 1936 |
| 2,191,662 | Huffaker | Feb. 27, 1940 |
| 2,345,999 | Babcock | Apr. 4, 1944 |
| 2,356,560 | Baumgartner | Aug. 22, 1944 |
| 2,448,659 | Champion | Sept. 7, 1948 |
| 2,621,866 | Harvey | Dec. 16, 1952 |
| 2,652,210 | Hodges | Sept. 15, 1953 |
| 2,726,919 | Hathaway, et al. | Dec. 13, 1955 |